United States Patent
Yadav et al.

(10) Patent No.: US 10,079,846 B2
(45) Date of Patent: Sep. 18, 2018

(54) DOMAIN NAME SYSTEM (DNS) BASED ANOMALY DETECTION

(71) Applicant: CISCO TECHNOLOGY, INC., San Jose, CA (US)

(72) Inventors: Navindra Yadav, Cupertino, CA (US); Ellen Scheib, Mountain View, CA (US); Rachita Agasthy, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 162 days.

(21) Appl. No.: 15/097,236

(22) Filed: Apr. 12, 2016

(65) Prior Publication Data

US 2016/0359887 A1    Dec. 8, 2016

Related U.S. Application Data

(60) Provisional application No. 62/171,044, filed on Jun. 4, 2015.

(51) Int. Cl.
*H04L 29/06* (2006.01)
*H04L 29/12* (2006.01)

(52) U.S. Cl.
CPC ...... *H04L 63/1425* (2013.01); *H04L 61/1511* (2013.01); *H04L 61/2514* (2013.01)

(58) Field of Classification Search
CPC ............. H04L 63/1425; H04L 61/1511; H04L 61/2514
See application file for complete search history.

(56) References Cited

U.S. PATENT DOCUMENTS

| | | | |
|---|---|---|---|
| 6,052,788 A * | 4/2000 | Wesinger, Jr. | ........ B65B 11/004 709/227 |
| 7,584,507 B1 | 9/2009 | Nucci | |
| 7,626,940 B2 | 12/2009 | Jain | |
| 8,260,914 B1 * | 9/2012 | Ranjan | ................ H04L 61/1511 709/224 |
| 8,806,626 B2 | 8/2014 | Gardner | |
| 9,172,716 B2 | 10/2015 | Mugali et al. | |
| 2004/0205374 A1 * | 10/2004 | Poletto | .................. H04L 41/064 714/4.2 |

(Continued)

OTHER PUBLICATIONS

Nguyen,TTT;Armitage,G,"A survey of techniques for internet traffic classification using machine learning" in Communications Surveys & Tutorials,IEEE ,vol. 10,No. 4,pp. 56-76,2004.

(Continued)

*Primary Examiner* — Joseph P Hirl
*Assistant Examiner* — J. Brant Murphy
(74) *Attorney, Agent, or Firm* — Cindy Kaplan

(57) ABSTRACT

In one embodiment, a method includes receiving at an analytics module operating at a network device, network traffic data collected from a plurality of sensors distributed throughout a network and installed in network components to obtain the network traffic data, identifying at the analytics module, Domain Name System (DNS) exchanges within the network, associating at the analytics module, the DNS exchanges with process, user, and host information, and identifying at the analytics module, anomalies in the DNS exchanges. An apparatus and logic are also disclosed herein.

20 Claims, 10 Drawing Sheets

(56) References Cited

U.S. PATENT DOCUMENTS

| | | | | |
|---|---|---|---|---|
| 2009/0161554 A1* | 6/2009 | Agarwal | ............. | H04L 41/0631 370/241 |
| 2014/0075558 A1* | 3/2014 | Ward | ................. | H04L 63/1425 726/23 |
| 2014/0245436 A1* | 8/2014 | Dagon | ............. | H04L 29/12066 726/22 |
| 2015/0019708 A1* | 1/2015 | Denis | ..................... | H04L 43/04 709/224 |
| 2015/0373039 A1* | 12/2015 | Wang | ................. | H04L 63/1425 726/23 |

OTHER PUBLICATIONS

Leyla Bilge et al "Exposure: A Passive DNS Analysis Service to Detect and Report Malicious Domains" ACM Trans. Inf. Syst. Secur. 16, 4, Article 14 (Apr. 2014), 28 pages.

Cejka, T, et al "Stream-wise detection of surreptitious traffic over DNS," (CAMAD) 2014 IEEE 19th International Workshop on , vol., No., pp. 300-304, Dec. 1-3, 2014.

Burghouwt,P,et al "Detection of botnet collusion by degree distribution of domains," (ICITST),2010 International Conf.,pp. 1-8, Nov. 8-11, 2010.

* cited by examiner

DOMAIN NAME SYSTEM (DNS) BASED ANOMALY DETECTION

STATEMENT OF RELATED APPLICATION

The present application claims priority from U.S. Provisional Application No. 62/171,044, entitled ANOMALY DETECTION WITH PERVASIVE VIEW OF NETWORK BEHAVIOR, filed on Jun. 4, 2015. The contents of this provisional application are incorporated herein by reference in its entirety.

TECHNICAL FIELD

The present disclosure relates generally to communication networks, and more particularly, to anomaly detection.

BACKGROUND

Anomaly detection is used to identify items, events, or traffic that exhibit behavior that does not conform to an expected pattern or data. Anomaly detection systems may, for example, learn normal activity and take action for behavior that deviates from what is learned as normal behavior.

The Domain Name System (DNS) is used for the translation of domain names to network addresses. Many different types of DNS attacks are used by malicious entities to direct a user to a malicious server. Misuse of DNS infrastructure may also open a way to transfer data from a restricted area.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
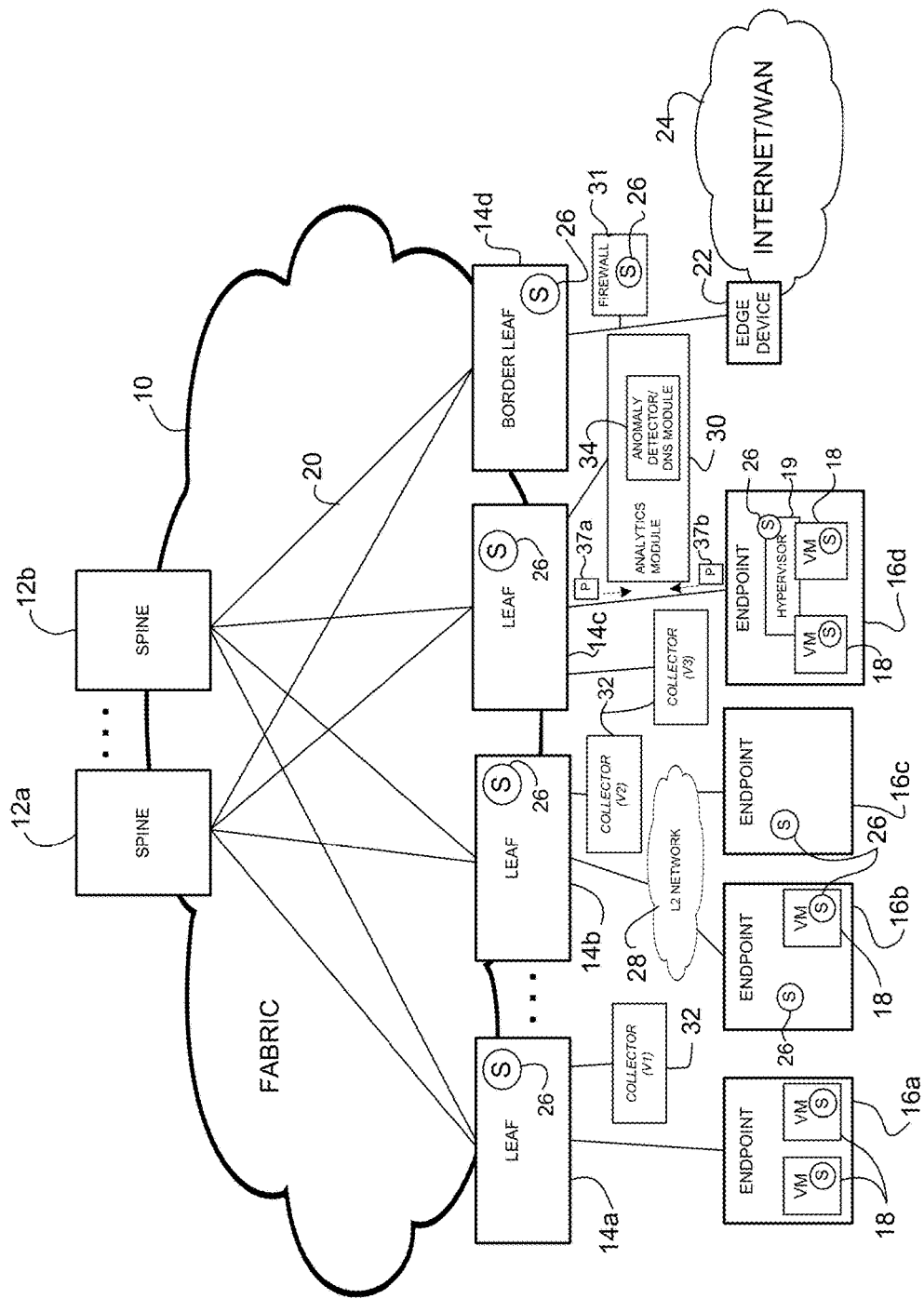
FIG. 1 illustrates an example of a network in which embodiments described herein may be implemented.

In one embodiment, a method generally comprises receiving at an analytics module operating at a network device, network traffic data collected from a plurality of sensors distributed throughout a network and installed in network components to obtain the network traffic data, identifying at the analytics module, Domain Name System (DNS) exchanges within the network, associating at the analytics module, the DNS exchanges with process, user, and host information, and identifying at the analytics module, anomalies in the DNS exchanges.

In another embodiment, an apparatus generally comprises an interface for receiving network traffic data collected from a plurality of sensors distributed throughout a network and installed in network components to obtain the network traffic data and a processor for identifying Domain Name System (DNS) exchanges within the network, associating the DNS exchanges with process, user, and host information, and identifying anomalies in the DNS exchanges.

In yet another embodiment, logic is encoded on one or more non-transitory computer readable media for execution and when executed operable to process at an analytics module operating at a network device, network traffic data collected from a plurality of sensors distributed throughout a network and installed in network components to obtain the network traffic data, identify at the analytics module, Domain Name System (DNS) exchanges within the network, associate at the analytics module, the DNS exchanges with process, user, and host information, and identify at the analytics module, anomalies in the DNS exchanges.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

The Domain Name System (DNS) is a naming system for computers, services, or any resource connected to the Internet or private network and may be used to associate various information with domain names assigned to participating entities. DNS allows network resources to request IP (Internet Protocol) address information relating to a particular domain name. Malicious entities may use DNS to attack computers or networks. For example, botnets (collections of malicious software agents) may use DNS as a component of their command and control (C&C) communication or domain fluxing may be used for command and control of a botnet. Random domain names may also be generated in order to avoid detection. DNS based anomalies may be difficult to detect with conventional client or network based security systems since conventional anomaly detection occurs at a high level and does not check all traffic. Conventional technologies for detecting presence of malicious behavior in networks typically collect data from a single vantage point in the network and identify suspicious behavior at that point using specific (static) rules or signatures, which makes it difficult to detect anomalous DNS behavior. For example, it may be difficult for network only security to detect local DNS attacks or client based security to detect manipulation of a DNS record.

The embodiments described herein are directed to DNS based anomaly detection and prevention. The anomaly detection system may be used, for example, to identify suspicious network activity potentially indicative of malicious behavior. The identified anomaly may be used for downstream purposes including network forensics, policy decision making, and enforcement. Embodiments described herein provide a big data analytics platform that monitors everything (or almost everything) while providing pervasive security.

The DNS based anomaly detection system may be used for malware anomaly detection and prevention from command and control channel or site, for example. Sensors installed in components throughout the network may be used to gather information about DNS exchanges, including requests and responses. In one or more embodiments, scores may be calculated and used to determine if malware is present in the network. The DNS based anomaly detection system may also identify the use of DNS tunnels to carry data out of a network. For example, the system may monitor DNS exchanges to look for large sized or varying sizes of text files transferred out of a data center using a DNS tunnel.

As described below, network data may be collected throughout a network such as a data center using multiple vantage points. This provides a pervasive view of network behavior, using metadata from every (or almost every) packet. One or more embodiments may provide visibility from every (or almost every) host, process, and user perspective. The network metadata is combined in a central big data analytics platform for analysis. Since information about network behavior is captured from multiple perspectives, the various data sources can be correlated to provide a powerful information source for data analytics.

The comprehensive and pervasive information about network behavior that is collected over time and stored in a central location enables the use of machine learning algorithms to detect suspicious activity. Multiple approaches to modeling normal or typical network behavior may be used and activity that does not conform to this expected behavior may be flagged as suspicious, and may be investigated. Machine learning allows for the identification of anomalies within the network traffic based on dynamic modeling of network behavior.

Referring now to the drawings, and first to FIG. 1, a simplified network in which embodiments described herein may be implemented is shown. The embodiments operate in the context of a data communication network including multiple network devices. The network may include any number of network devices in communication via any number of nodes (e.g., routers, switches, gateways, controllers, edge devices, access devices, aggregation devices, core nodes, intermediate nodes, or other network devices), which facilitate passage of data within the network. The nodes may communicate over one or more networks (e.g., local area network (LAN), metropolitan area network (MAN), wide area network (WAN), virtual private network (VPN), virtual local area network (VLAN), wireless network, enterprise network, corporate network, Internet, intranet, radio access network, public switched network, or any other network). Network traffic may also travel between a main campus and remote branches or any other networks.

In the example of FIG. 1, a fabric 10 comprises a plurality of spine nodes 12a, 12b and leaf nodes 14a, 14b, 14c, 14d. The leaf nodes 14a, 14b, 14c, may connect to one or more endpoints (hosts) 16a, 16b, 16c, 16d (e.g., servers hosting virtual machines (VMs) 18). The leaf nodes 14a, 14b, 14c, 14d are each connected to a plurality of spine nodes 12a, 12b via links 20. In the example shown in FIG. 1, each leaf node 14a, 14b, 14c, 14d is connected to each of the spine nodes 12a, 12b and is configured to route communications between the hosts 16a, 16b, 16c, 16d and other network elements.

The leaf nodes 14a, 14b, 14c, 14d and hosts 16a, 16b, 16c, 16d may be in communication via any number of nodes or networks. As shown in the example of FIG. 1, one or more servers 16b, 16c may be in communication via a network 28 (e.g., layer 2 (L2) network). In the example shown in FIG. 1, border leaf node 14d is in communication with an edge device 22 (e.g., router) located in an external network 24 (e.g., Internet/WAN (Wide Area Network)). The border leaf 14d may be used to connect any type of external network device, service (e.g., firewall 31), or network (e.g., layer 3 (L3) network) to the fabric 10.

The spine nodes 12a, 12b and leaf nodes 14a, 14b, 14c, 14d may be switches, routers, or other network devices (e.g., L2, L3, or L2/L3 devices) comprising network switching or routing elements configured to perform forwarding functions. The leaf nodes 14a, 14b, 14c, 14d may include, for example, access ports (or non-fabric ports) to provide connectivity for hosts 16a, 16b, 16c, 16d, virtual machines 18, or other devices or external networks (e.g., network 24), and fabric ports for providing uplinks to spine switches 12a, 12b.

The leaf nodes 14a, 14b, 14c, 14d may be implemented, for example, as switching elements (e.g., Top of Rack (ToR) switches) or any other network element. The leaf nodes 14a, 14b, 14c, 14d may also comprise aggregation switches in an end-of-row or middle-of-row topology, or any other topology. The leaf nodes 14a, 14b, 14c, 14d may be located at the edge of the network fabric 10 and thus represent the physical network edge. One or more of the leaf nodes 14a, 14b, 14c, 14d may connect Endpoint Groups (EGPs) to network fabric 10, internal networks (e.g., network 28), or any external network (e.g., network 24). EPGs may be used, for example, for mapping applications to the network.

Endpoints 16a, 16b, 16c, 16d may connect to network fabric 10 via the leaf nodes 14a, 14b, 14c. In the example shown in FIG. 1, endpoints 16a and 16d connect directly to leaf nodes 14a and 14c, respectively, which can connect the hosts to the network fabric 10 or any other of the leaf nodes. Endpoints 16b and 16c connect to leaf node 14b via L2 network 28. Endpoints 16b, 16c and L2 network 28 may define a LAN (Local Area Network). The LAN may connect nodes over dedicated private communication links located in the same general physical location, such as a building or campus.

WAN 24 may connect to leaf node 14d via an L3 network (not shown). The WAN 24 may connect geographically dispersed nodes over long distance communication links, such as common carrier telephone lines, optical lightpaths, synchronous optical networks (SONETs), or synchronous digital hierarchy (SDH) links. The Internet is an example of a WAN that connects disparate networks and provides global communication between nodes on various networks. The nodes may communicate over the network by exchanging discrete frames or packets of data according to predefined protocols, such as Transmission Control Protocol (TCP)/Internet Protocol (IP).

One or more of the endpoints may have instantiated thereon one or more virtual switches (not shown) for communication with one or more virtual machines 18. Virtual switches and virtual machines 18 may be created and run on each physical server on top of a hypervisor 19 installed on the server, as shown for endpoint 16d. For ease of illustration, the hypervisor 19 is only shown on endpoint 16d, but it is to be understood that one or more of the other endpoints having virtual machines 18 installed thereon may also comprise a hypervisor. Also, one or more of the endpoints may include a virtual switch. The virtual machines 18 are configured to exchange communication with other virtual machines. The network may include any number of physical servers hosting any number of virtual machines 18. The host may also comprise blade/physical servers without virtual machines (e.g., host 16c in FIG. 1).

The term 'host' or 'endpoint' as used herein may refer to a physical device (e.g., server, endpoint 16a, 16b, 16c, 16d) or a virtual element (e.g., virtual machine 18). The endpoint may include any communication device or component, such as a computer, server, hypervisor, virtual machine, container, process (e.g., running on a virtual machine), switch, router, gateway, host, device, external network, etc.

One or more network devices may be configured with virtual tunnel endpoint (VTEP) functionality, which connects an overlay network (not shown) with network fabric 10. The overlay network may allow virtual networks to be created and layered over a physical network infrastructure.

The embodiments include a network behavior data collection and analytics system comprising a plurality of sensors 26 located throughout the network, collectors 32, and analytics module 30. The data monitoring and collection system may be integrated with existing switching hardware and software and operate within an Application-Centric Infrastructure (ACI), for example.

In certain embodiments, the sensors 26 are located at components throughout the network so that all packets are monitored. For example, the sensors 26 may be used to collect metadata for every packet traversing the network (e.g., east-west, north-south). The sensors 26 may be installed in network components to obtain network traffic data from packets transmitted from and received at the network components and monitor all network flows within the network. The term 'component' as used herein may refer to a component of the network (e.g., process, module, slice, blade, server, hypervisor, machine, virtual machine, switch, router, gateway, etc.).

In some embodiments, the sensors 26 are located at each network component to allow for granular packet statistics and data at each hop of data transmission. In other embodiments, sensors 26 may not be installed in all components or portions of the network (e.g., shared hosting environment in which customers have exclusive control of some virtual machines 18).

The sensors 26 may reside on nodes of a data center network (e.g., virtual partition, hypervisor, physical server, switch, router, gateway, or any other network device). In the example shown in FIG. 1, the sensors 26 are located at server 16c, virtual machines 18, hypervisor 19, leaf nodes 14a, 14b, 14c, 14d, and firewall 31. The sensors 26 may also be located at one or more spine nodes 12a, 12b or interposed between network elements.

A network device (e.g., endpoints 16a, 16b, 16d) may include multiple sensors 26 running on various components within the device (e.g., virtual machines, hypervisor, host) so that all packets are monitored (e.g., packets 37a, 37b to and from components). For example, network device 16d in the example of FIG. 1 includes sensors 26 residing on the hypervisor 19 and virtual machines 18 running on the host.

The installation of the sensors 26 at components throughout the network allows for analysis of network traffic data to and from each point along the path of a packet within the ACI. This layered sensor structure provides for identification of the component (i.e., virtual machine, hypervisor, switch) that sent the data and when the data was sent, as well as the particular characteristics of the packets sent and received at each point in the network. This also allows for the determination of which specific process and virtual machine 18 is associated with a network flow. In order to make this determination, the sensor 26 running on the virtual machine 18 associated with the flow may analyze the traffic from the virtual machine, as well as all the processes running on the virtual machine and, based on the traffic from the virtual machine, and the processes running on the virtual machine, the sensor 26 can extract flow and process information to determine specifically which process in the virtual machine is responsible for the flow. The sensor 26 may also extract user information in order to identify which user and process is associated with a particular flow. In one example, the sensor 26 may then label the process and user information and send it to the collector 32, which collects the statistics and analytics data for the various sensors 26 in the virtual machines 18, hypervisors 19, and switches 14a, 14b, 14c, 14d.

As previously described, the sensors 26 are located to identify packets and network flows transmitted throughout the system. For example, if one of the VMs 18 running at host 16d receives a packet 37a from the Internet 24, it may pass through router 22, firewall 31, switches 14d, 14c, hypervisor 19, and the VM. Since each of these components contains a sensor 26, the packet 37a will be identified and reported to collectors 32. In another example, if packet 37b is transmitted from VM 18 running on host 16d to VM 18 running on host 16a, sensors installed along the data path including at VM 18, hypervisor 19, leaf node 14c, leaf node 14a, and the VM at node 16a will collect metadata from the packet.

The sensors 26 may be used to collect information including, but not limited to, network information comprising metadata from every (or almost every) packet, process information, user information, virtual machine information, tenant information, network topology information, or other information based on data collected from each packet transmitted on the data path. The network traffic data may be associated with a packet, collection of packets, flow, group of flows, etc. The network traffic data may comprise, for example, VM ID, sensor ID, associated process ID, associated process name, process user name, sensor private key, geo-location of sensor, environmental details, etc. The network traffic data may also include information describing communication on all layers of the OSI (Open Systems Interconnection) model. For example, the network traffic data may include signal strength (if applicable), source/destination MAC (Media Access Control) address, source/destination IP (Internet Protocol) address, protocol, port number, encryption data, requesting process, sample packet, etc. In one or more embodiments, the sensors 26 may be configured to capture only a representative sample of packets.

The system may also collect network performance data, which may include, for example, information specific to file transfers initiated by the network devices, exchanged emails, retransmitted files, registry access, file access, network failures, component failures, and the like. Other data such as bandwidth, throughput, latency, jitter, error rate, and the like may also be collected.

Since the sensors 26 are located throughout the network, the data is collected using multiple vantage points (i.e., from multiple perspectives in the network) to provide a pervasive view of network behavior. The capture of network behavior information from multiple perspectives rather than just at a single sensor located in the data path or in communication with a component in the data path, allows data to be correlated from the various data sources to provide a useful information source for data analytics and anomaly detection. For example, the plurality of sensors 26 providing data to the collectors 32 may provide information from various network perspectives (view V1, view V2, view V3, etc.), as shown in FIG. 1.

The sensors 26 may comprise, for example, software (e.g., running on a virtual machine, container, virtual switch, hypervisor, physical server, or other device), an application-specific integrated circuit (ASIC) (e.g., component of a switch, gateway, router, standalone packet monitor, PCAP (packet capture) module), or other device. The sensors 26 may also operate at an operating system (e.g., Linux, Windows) or bare metal environment. In one example, the ASIC may be operable to provide an export interval of 10 msecs to 1000 msecs (or more or less) and the software may be operable to provide an export interval of approximately one second (or more or less). Sensors 26 may be lightweight, thereby minimally impacting normal traffic and compute resources in a data center. The sensors 26 may, for example, sniff packets sent over its host Network Interface Card (NIC) or individual processes may be configured to report traffic to the sensors. Sensor enforcement may comprise, for example, hardware, ACI/standalone, software, IP tables, Windows filtering platform, etc.

As the sensors 26 capture communications, they may continuously send network traffic data to collectors 32 for storage. The sensors 26 may send their records to one or more of the collectors 32. In one example, the sensors may be assigned primary and secondary collectors 32. In another example, the sensors 26 may determine an optimal collector 32 through a discovery process.

In certain embodiments, the sensors 26 may preprocess network traffic data before sending it to the collectors 32. For example, the sensors 26 may remove extraneous or duplicative data or create a summary of the data (e.g., latency, packets, bytes sent per flow, flagged abnormal activity, etc.). The collectors 32 may serve as network storage for the system or the collectors may organize, summarize, and preprocess data. For example, the collectors 32 may tabulate data, characterize traffic flows, match packets to identify traffic flows and connection links, or flag anomalous data. The collectors 32 may also consolidate network traffic flow data according to various time periods.

Information collected at the collectors 32 may include, for example, network information (e.g., metadata from every packet, east-west and north-south), process information, user information (e.g., user identification (ID), user group, user credentials), virtual machine information (e.g., VM ID, processing capabilities, location, state), tenant information (e.g., access control lists), network topology, etc. Collected data may also comprise packet flow data that describes packet flow information or is derived from packet flow information, which may include, for example, a five-tuple or other set of values that are common to all packets that are related in a flow (e.g., source address, destination address, source port, destination port, and protocol value, or any combination of these or other identifiers). The collectors 32 may utilize various types of database structures and memory, which may have various formats or schemas.

In some embodiments, the collectors 32 may be directly connected to a top-of-rack switch (e.g., leaf node). In other embodiments, the collectors 32 may be located near an end-of-row switch. In certain embodiments, one or more of the leaf nodes 14a, 14b, 14c, 14d may each have an associated collector 32. For example, if the leaf node is a top-of-rack switch, then each rack may contain an assigned collector 32. The system may include any number of collectors 32 (e.g., one or more).

The analytics module 30 is configured to receive and process network traffic data collected by collectors 32 and detected by sensors 26 placed on nodes located throughout the network. The analytics module 30 may be, for example, a standalone network appliance or implemented as a VM image that can be distributed onto a VM, cluster of VMs, Software as a Service (SaaS), or other suitable distribution model. The analytics module 30 may also be located at one of the endpoints or other network device, or distributed among one or more network devices.

In certain embodiments, the analytics module 30 may be implemented in an active-standby model to ensure high availability, with a first analytics module functioning in a primary role and a second analytics module functioning in a secondary role. If the first analytics module fails, the second analytics module can take over control.

As shown in FIG. 1, the analytics module 30 includes an anomaly detector 34. The anomaly detector 34 may operate at any computer or network device (e.g., server, controller, appliance, management station, or other processing device or network element) operable to receive network performance data and, based on the received information, identify features in which an anomaly deviates from other features. The anomaly detection module 34 may, for example, learn what causes security violations by monitoring and analyzing behavior and events that occur prior to the security violation taking place, in order to prevent such events from occurring in the future.

Computer networks may be exposed to a variety of different attacks that expose vulnerabilities of computer systems in order to compromise their security. For example, network traffic transmitted on networks may be associated with malicious programs or devices. The anomaly detection module 34 may be provided with examples of network states corresponding to an attack and network states corresponding to normal operation. The anomaly detection module 34 can then analyze network traffic flow data to recognize when the network is under attack. In some example embodiments, the network may operate within a trusted environment for a period of time so that the anomaly detector 34 can establish a baseline normalcy. The analytics module 30 may include a database or norms and expectations for various components. The database may incorporate data from external sources. In certain embodiments, the analytics module 30 may use machine learning techniques to identify security threats to a network using the anomaly detection module 34. Since malware is constantly evolving and changing, machine learning may be used to dynamically update models that are used to identify malicious traffic patterns. Machine learning algorithms are used to provide for the identification of anomalies within the network traffic based on dynamic modeling of network behavior.

The anomaly detection module 34 may be used to identify observations which differ from other examples in a dataset. For example, if a training set of example data with known outlier labels exists, supervised anomaly detection techniques may be used. Supervised anomaly detection techniques utilize data sets that have been labeled as "normal" and "abnormal" and train a classifier. In a case in which it is unknown whether examples in the training data are outliers, unsupervised anomaly techniques may be used. Unsupervised anomaly detection techniques may be used to detect anomalies in an unlabeled test data set under the assumption that the majority of instances in the data set are normal by looking for instances that seem to fit to the remainder of the data set.

In one or more embodiments, the analytics device 30 comprises a DNS module operable to analyze DNS exchanges to find anomalies within a network such as a data center. As described in detail below, the DNS based anomaly detection may be used to identify inconsistencies and detect malware or DNS tunnels and prevent future attacks.

In certain embodiments, the analytics module 30 may determine dependencies of components within the network using an application dependency module, described further below with respect to FIG. 3. For example, if a first component routinely sends data to a second component but the second component never sends data to the first component, then the analytics module 30 can determine that the second component is dependent on the first component, but the first component is likely not dependent on the second component. If, however, the second component also sends data to the first component, then they are likely interdependent. These components may be processes, virtual machines, hypervisors, VLANs, etc. Once analytics module 30 has determined component dependencies, it can then form a component (application) dependency map. This map may be instructive when analytics module 30 attempts to determine a root cause of failure (e.g., failure of one component may cascade and cause failure of its dependent components). This map may also assist analytics module 30 when attempting to predict what will happen if a component is taken offline.

The analytics module 30 may establish patterns and norms for component behavior. For example, it can determine that certain processes (when functioning normally) will only send a certain amount of traffic to a certain VM using a small set of ports. The analytics module 30 may establish these norms by analyzing individual components or by analyzing data coming from similar components (e.g., VMs with similar configurations). Similarly, analytics module 30 may determine expectations for network operations. For example, it may determine the expected latency between two components, the expected throughput of a component, response times of a component, typical packet sizes, traffic flow signatures, etc. The analytics module 30 may combine its dependency map with pattern analysis to create reaction expectations. For example, if traffic increases with one component, other components may predictability increase traffic in response (or latency, compute time, etc.).

The analytics module 30 may also be used to address policy usage (e.g., how effective is each rule, can a rule be deleted), policy violations (e.g., who is violating, what is being violated), policy compliance/audit (e.g., is policy actually applied), policy "what ifs", policy suggestion, etc. In one embodiment, the analytics module 30 may also discover applications or select machines on which to discover applications, and then run application dependency algorithms. The analytics module 30 may then visualize and evaluate the data, and publish policies for simulation. The analytics module may be used to explore policy ramifications (e.g., add whitelists). The policies may then be published to a policy controller and real time compliance monitored. Once the policies are published, real time compliance reports may be generated. These may be used to select application dependency targets and side information.

It is to be understood that the network devices and topology shown in FIG. 1 and described above is only an example and the embodiments described herein may be implemented in networks comprising different network topologies or network devices, or using different protocols, without departing from the scope of the embodiments. For example, although network fabric 10 is illustrated and described herein as a leaf-spine architecture, the embodiments may be implemented based on any network topology, including any data center or cloud network fabric. The embodiments described herein may be implemented, for example, in other topologies including three-tier (e.g., core, aggregation, and access levels), fat tree, mesh, bus, hub and spoke, etc. The sensors 26 and collectors 32 may be placed throughout the network as appropriate according to various architectures. Furthermore, the DNS module at anomaly detector 34 may use network data (metadata) collected from any number of sensors either directly or via one or more collectors, from any number of locations within the network. Thus, the embodiments described herein for DNS based anomaly detection may be used in any network topology comprising any number or arrangement of data sensors or collectors. The network may include any number or type of network devices that facilitate passage of data over the network (e.g., routers, switches, gateways, controllers, appliances), network elements that operate as endpoints or hosts (e.g., servers, virtual machines, clients), and any number of network sites or domains in communication with any number of networks. As described below with respect to FIG. 5, one or more DNS servers may be located in the network.

Moreover, the topology illustrated in FIG. 1 and described above is readily scalable and may accommodate a large number of components, as well as more complicated arrangements and configurations. For example, the network may include any number of fabrics 10, which may be geographically dispersed or located in the same geographic area. Thus, network nodes may be used in any suitable network topology, which may include any number of servers, virtual machines, switches, routers, appliances, controllers, gateways, or other nodes interconnected to form a large and complex network, which may include cloud or fog computing. Nodes may be coupled to other nodes or networks through one or more interfaces employing any suitable wired or wireless connection, which provides a viable pathway for electronic communications.

Figure 2:
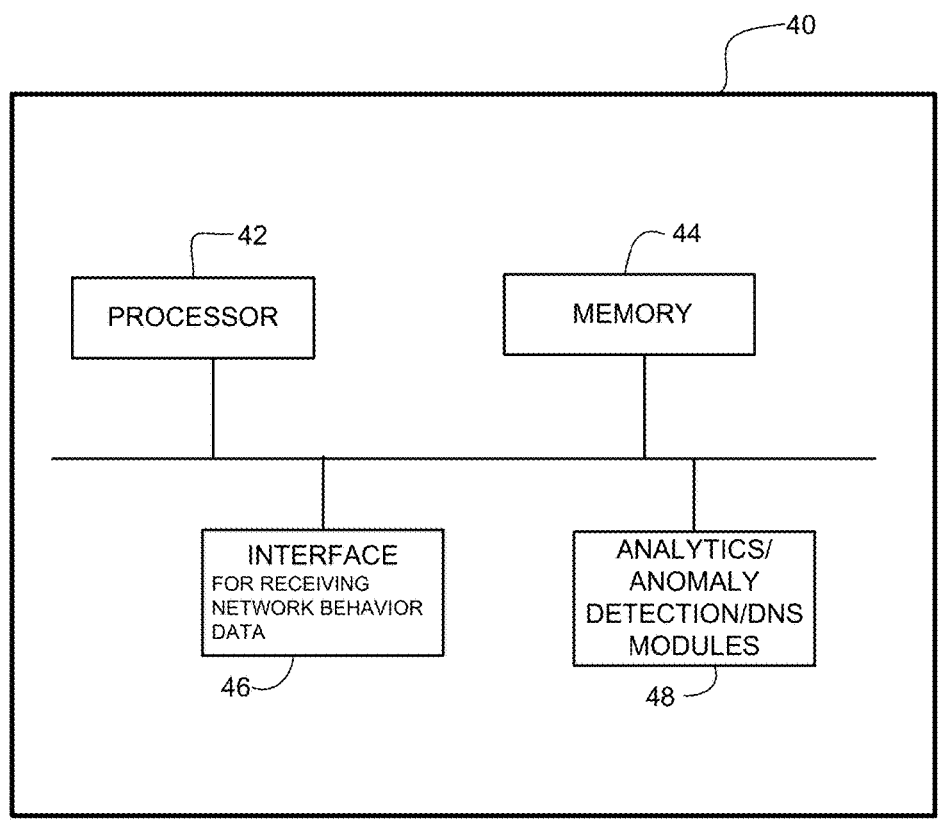
FIG. 2 depicts an example of a network device useful in implementing embodiments described herein.

FIG. 2 illustrates an example of a network device 40 (e.g., analytics device 30 in FIG. 1) that may be used to implement the embodiments described herein. In one embodiment, the network device 40 is a programmable machine that may be implemented in hardware, software, or any combination thereof. The network device 40 includes one or more processor 42, memory 44, network interface 46, and analytics/anomaly detection module 48 (analytics module 30, anomaly detector 34, DNS module shown in FIG. 1).

Memory 44 may be a volatile memory or non-volatile storage, which stores various applications, operating systems, modules, and data for execution and use by the processor 42. For example, analytics/anomaly detection/DNS components (e.g., module, code, logic, software, firmware, etc.) may be stored in memory 44. The device may include any number of memory components.

Logic may be encoded in one or more tangible media for execution by the processor 42. For example, the processor 42 may execute codes stored in a computer-readable medium such as memory 44 to perform the processes described below with respect to FIGS. 5 and 6. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. The network device may include any number of processors 42. In one example, the computer-readable medium comprises a non-transitory computer-readable medium.

The network interface 46 may comprise any number of interfaces (linecards, ports) for receiving data or transmitting data to other devices. The network interface 46 may include, for example, an Ethernet interface for connection to a computer or network. As shown in FIG. 1 and described above, the interface 46 may be configured to receive traffic data collected from a plurality of sensors 26 distributed throughout the network. The network interface 46 may be configured to transmit or receive data using a variety of different communication protocols. The interface may include mechanical, electrical, and signaling circuitry for communicating data over physical links coupled to the network. The network device 40 may further include any number of input or output devices.

It is to be understood that the network device 40 shown in FIG. 2 and described above is only an example and that different configurations of network devices may be used. For example, the network device 40 may further include any suitable combination of hardware, software, processors, devices, components, modules, or elements operable to facilitate the capabilities described herein.

Figure 3:
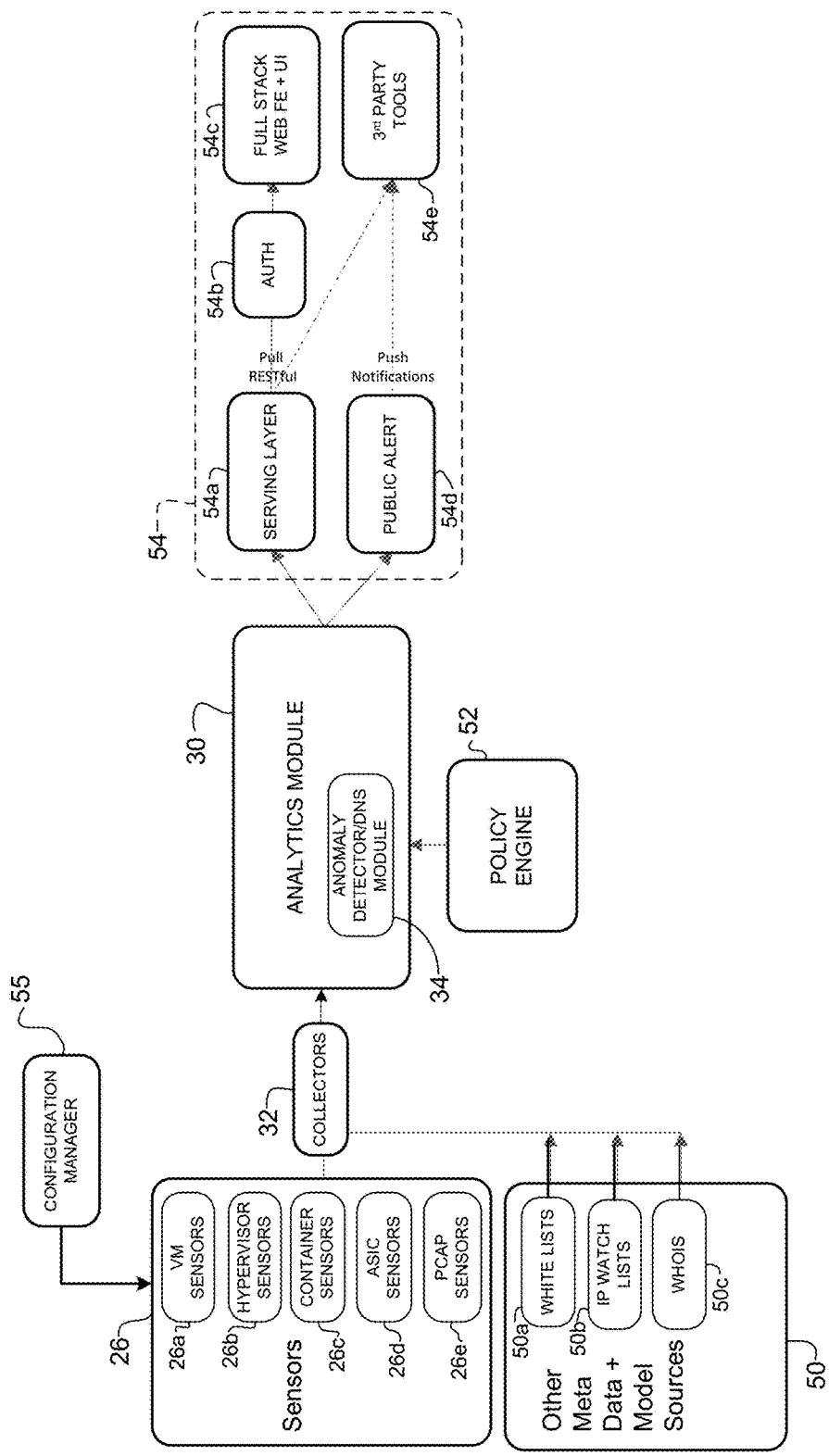
FIG. 3 illustrates a network behavior collection and analytics system for use in anomaly detection, in accordance with one embodiment.

FIG. 3 illustrates an example of a network behavior data collection and analytics system in accordance with one embodiment. The system may include sensors 26, collectors 32, and analytics module (engine) 30 described above with respect to FIG. 1. In the example shown in FIG. 3, the system further includes external data sources 50, policy engine 52, and presentation module 54. The analytics module 30 receives input from the sensors 26 via collectors 32 and from external data sources 50, while also interacting with the policy engine 52, which may receive input from a network/security policy controller (not shown). The analytics module 30 may provide input (e.g., via pull or push notifications) to a user interface or third party tools, via presentation module 54, for example.

In one embodiment, the sensors 26 may be provisioned and maintained by a configuration and image manager 55. For example, when a new virtual machine 18 is instantiated or when an existing VM migrates, configuration manager 55 may provision and configure a new sensor 26 on the VM (FIGS. 1 and 3).

As previously described, the sensors 26 may reside on nodes of a data center network. One or more of the sensors 26 may comprise, for example, software (e.g., piece of software running (residing) on a virtual partition, which may be an instance of a VM (VM sensor 26*a*), hypervisor (hypervisor sensor 26*b*), sandbox, container (container sensor 26*c*), virtual switch, physical server, or any other environment in which software is operating). The sensor 26 may also comprise an application-specific integrated circuit (ASIC) (ASIC sensor 26*d*) (e.g., component of a switch, gateway, router, standalone packet monitor, or other network device including a packet capture (PCAP) module (PCAP sensor 26*e*) or similar technology), or an independent unit (e.g., device connected to a network device's monitoring port or a device connected in series along a main trunk (link, path) of a data center).

The sensors 26 may send their records over a high-speed connection to one or more of the collectors 32 for storage. In certain embodiments, one or more collectors 32 may receive data from external data sources 50 (e.g., whitelists 50*a*, IP watch lists 50*b*, Whois data 50*c*, or out-of-band data.

In one or more embodiments, the system may comprise a wide bandwidth connection between collectors 32 and analytics module 30.

As described above, the analytics module 30 comprises an anomaly detection module 34, which may use machine learning techniques to identify security threats to a network. In one or more embodiments, the anomaly detector includes a DNS module operable to analyze DNS exchanges and identify anomalies, as described in detail below. Anomaly detection module 34 may include examples of network states corresponding to an attack and network states corresponding to normal operation. The anomaly detection module 34 can then analyze network traffic flow data to recognize when the network is under attack. The analytics module 30 may store norms and expectations for various components in a database, which may also incorporate data from external sources 50. Analytics module 30 may then create access policies for how components can interact using policy engine 52. Policies may also be established external to the system and the policy engine 52 may incorporate them into the analytics module 30.

Figure 10:
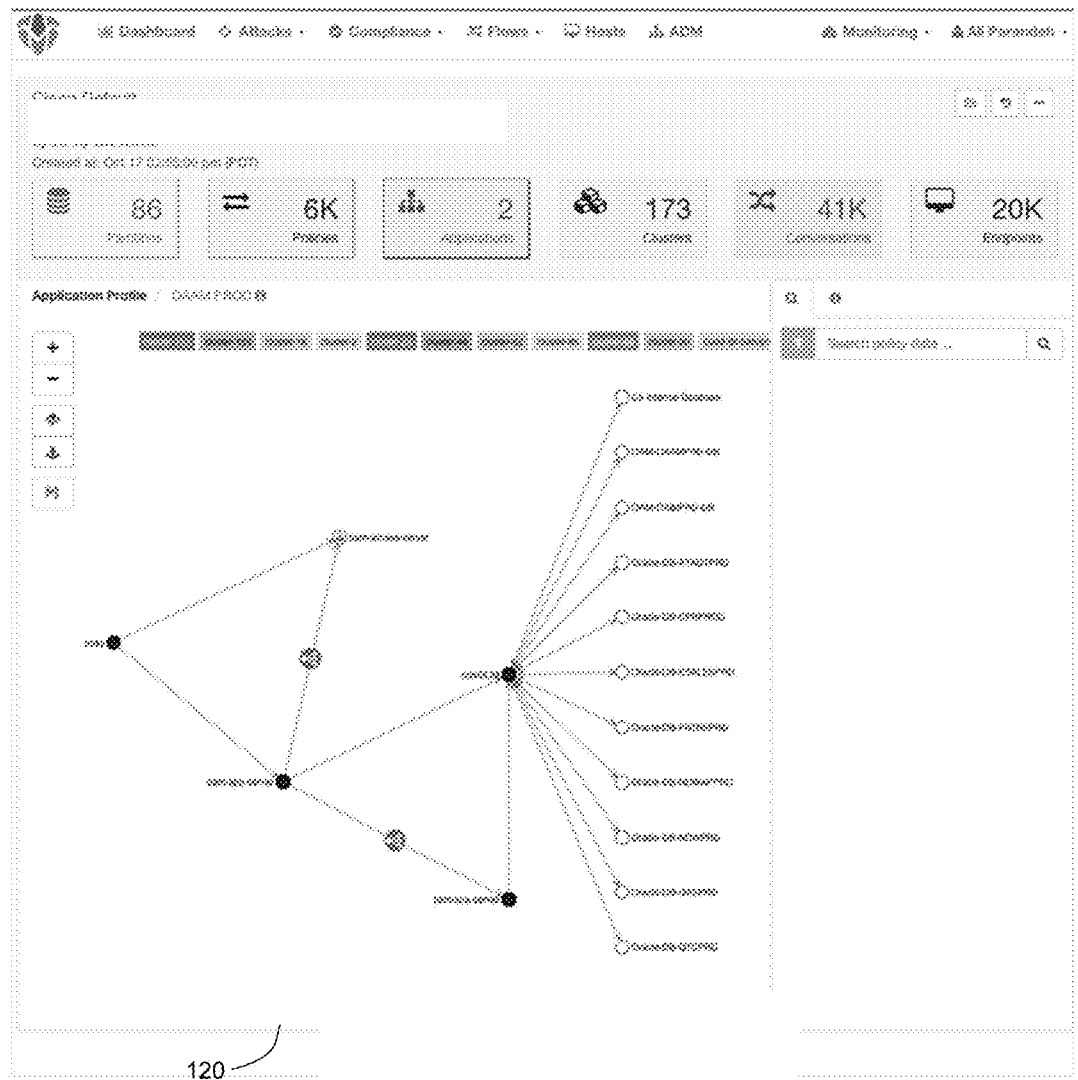
FIG. 10 illustrates an example of a graphical user interface for use in application discovery.

The presentation module 54 provides an external interface for the system and may include, for example, a serving layer 54*a*, authentication module 54*b*, web front end and UI (User Interface) 54*c*, public alert module 54*d*, and third party tools 54*e*. The presentation module 54 may preprocess, summarize, filter, or organize data for external presentation. In one embodiment, the presentation module 54 generates a graphical user interfaces as shown in FIG. 10.

The serving layer 54*a* may operate as the interface between presentation module 54 and the analytics module 30. The presentation module 54 may be used to generate a webpage. The web front end 54*c* may, for example, connect with the serving layer 54*a* to present data from the serving layer in a webpage comprising bar charts, core charts, tree maps, acyclic dependency maps, line graphs, tables, and the like.

The public alert module 54*d* may use analytic data generated or accessible through analytics module 30 and identify network conditions that satisfy specified criteria and push alerts to the third party tools 54*e*. One example of a third party tool 54*e* is a Security Information and Event Management (SIEM) system. Third party tools 54*e* may retrieve information from serving layer 54*a* through an API (Application Programming Interface) and present the information according to the SIEM's user interface, for example.

Figure 4:
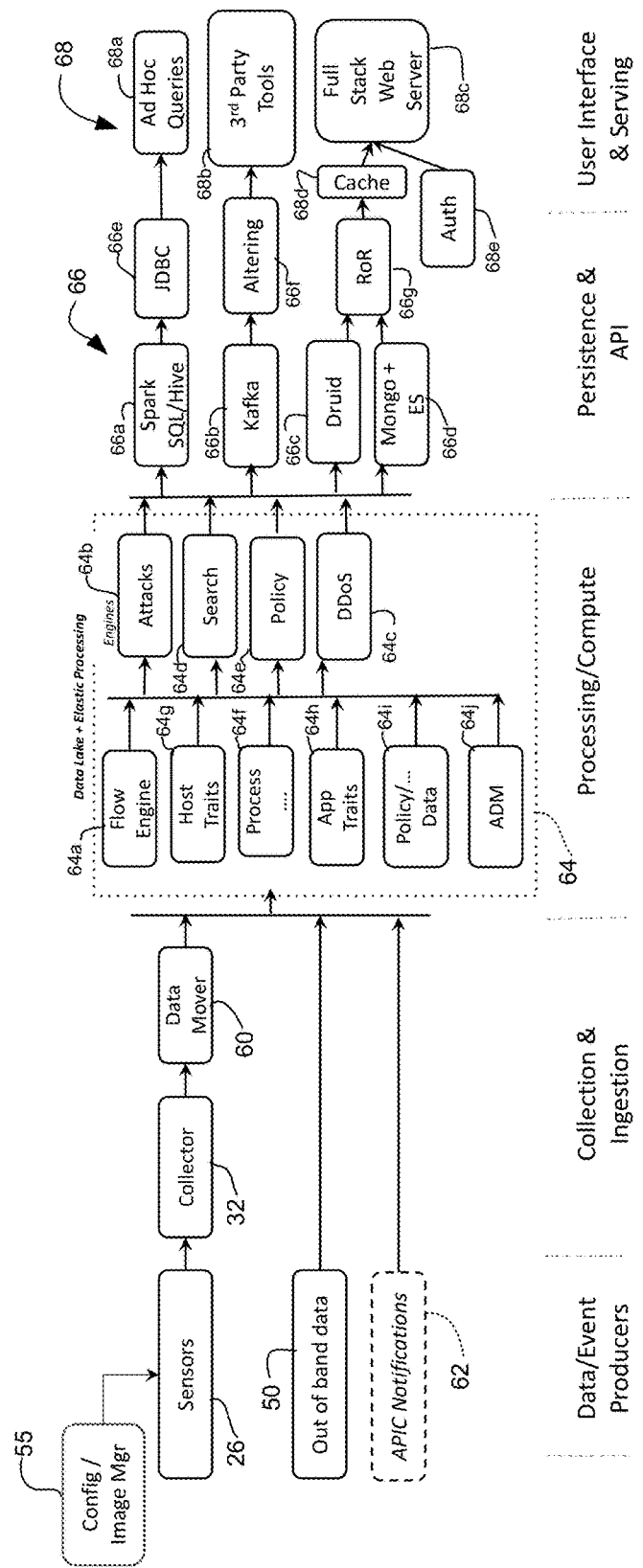
FIG. 4 illustrates details of the system of FIG. 3, in accordance with one embodiment.

FIG. 4 illustrates an example of a data processing architecture of the network behavior data collection and analytics system shown in FIG. 3, in accordance with one embodiment. As previously described, the system includes a configuration/image manager 55 that may be used to configure or manage the sensors 26, which provide data to one or more collectors 32. A data mover 60 transmits data from the collector 32 to one or more processing engines 64. The processing engine 64 may also receive out of band data 50 or APIC (Application Policy Infrastructure Controller) notifications 62. Data may be received and processed at a data lake or other storage repository. The data lake may be configured, for example, to store 275 Tbytes (or more or less) of raw data. The system may include any number of engines, including for example, engines for identifying flows (flow engine 64*a*) or attacks including DDoS (Distributed Denial of Service) attacks (attack engine 64*b*, DDoS engine 64*c*). The system may further include a search engine 64*d* and policy engine 64*e*. The search engine 64*d* may be configured, for example to perform a structured search, an NLP (Natural Language Processing) search, or a visual search. Data may be provided to the engines from one or more processing components.

The processing/compute engine 64 may further include processing component 64f operable, for example, to identify host traits 64g and application traits 64h and to perform application dependency mapping (ADM 64j). The process component 64f may include processor components operable to provide DNS based anomaly detection, as described below. The DDoS engine 64c may generate models online while the ADM 64j generates models offline, for example. In one embodiment, the processing engine is a horizontally scalable system that includes predefined static behavior rules. The compute engine may receive data from one or more policy/data processing components 64i.

The traffic monitoring system may further include a persistence and API (Application Programming Interface) portion, generally indicated at 66. This portion of the system may include various database programs and access protocols (e.g., Spark, Hive, SQL (Structured Query Language) 66a, Kafka 66b, Druid 66c, Mongo 66d), which interface with database programs (e.g. JDBC (JAVA Database Connectivity) 66e, altering 66f, RoR (Ruby on Rails) 66g). These or other applications may be used to identify, organize, summarize, or present data for use at the user interface and serving components, generally indicated at 68, and described above with respect to FIG. 3. User interface and serving segment 68 may include various interfaces, including for example, ad hoc queries 68a, third party tools 68b, and full stack web server 68c, which may receive input from cache 68d and authentication module 68e.

It is to be understood that the system and architecture shown in FIGS. 3 and 4, and described above is only an example and that the system may include any number or type of components (e.g., databases, processes, applications, modules, engines, interfaces) arranged in various configurations or architectures, without departing from the scope of the embodiments. For example, sensors 26 and collectors 32 may belong to one hardware or software module or multiple separate modules. Other modules may also be combined into fewer components or further divided into more components.

As described above, in one or more embodiments, the anomaly detection system comprises a DNS based anomaly detection system. The system may be used, for example, to detect malware or DNS tunnels used to carry data out of a network. As previously described, the data analytics system provides a pervasive view of the network, which allows for identification of the full context of DNS. DNS visibility is provided from every (or almost every) host, process, and user perspective. An entire view of an application may be constructed by identifying which process, user, or machine is involved in a DNS exchange.

Figure 5:
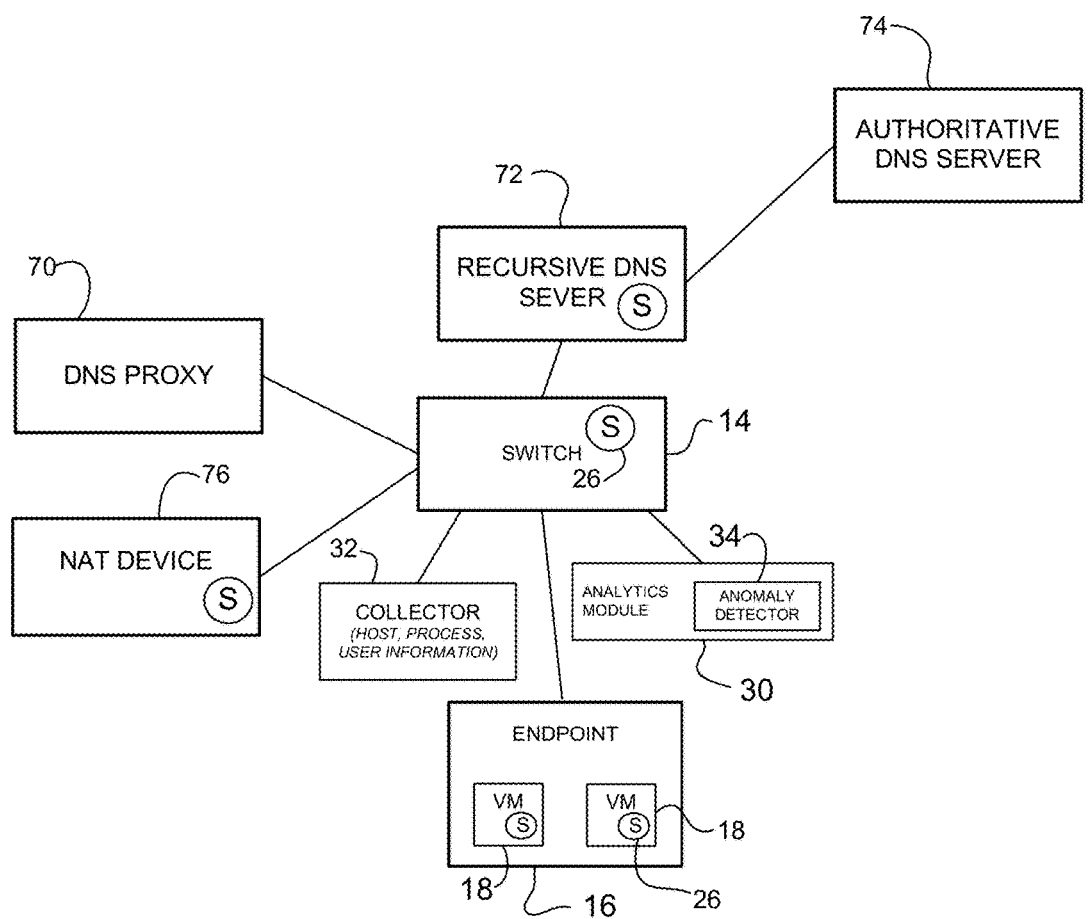
FIG. 5 is a diagram illustrating interaction of components from the network of FIG. 1 with various Domain Name System (DNS) and Network Address Translation (NAT) devices.

FIG. 5 illustrates a simplified view of a node (e.g., switch) 14 from the network of FIG. 1 in communication with various network devices 70, 72, 74, 76 that may be used for communication with a network (private or public) (not shown). For example, components of a data center, such as switch 14, may be in communication with one or more DNS or NAT devices operable to provide information used to access or translate addresses used to contact one or more computers, resources, networks, servers, etc. The network devices shown in FIG. 5 include a DNS proxy 70, DNS server (e.g., recursive DNS sever 72, authoritative DNS server 74), and NAT (Network Address Translation) device 76. It is to be understood that these devices are shown only as an example, and that node 14 may be in communication with only one of these devices or any combination of these devices for use in connecting endpoint 16 with one or more components (e.g., server, host) in one or more networks. Also, there may be any number of nodes or networks interposed between the switch 14 and DNS or NAT device.

As previously described, DNS facilitates the translation between IP addresses and domain names by maintaining accessible records that associate one or more domain names with one or more IP addresses. The DNS is maintained by a distributed database system comprising name servers. Each domain has at least one authoritative DNS server 74 that publishes information about the domain and name servers of any domains subordinate to it. Recursion is a name-resolution technique in which recursive DNS server 72 queries other DNS servers on behalf of the requesting client to fully resolve the name and then sends an answer back to the client 16. The authoritative DNS server 74 lets recursive DNS server 72 know what DNS data a given host name has. There may be any number of servers in the authoritative DNS hierarchy. The client (endpoint 16, VM 18) may transmit a request to the recursive DNS server 72 to find the IP address associated with a website. If the recursive DNS server 72 does not have the DNS record cached, it may contact the authoritative server 74 (or other server such as a root DNS server or top level domain server in the authoritative DNS hierarchy). Attackers may use recursion to deny the DNS server service.

The DNS proxy server 70 may be used to direct client requests to a proxy server and obscure the IP address of the client 16.

The NAT device 76 may be used to remap one IP address space into another by modifying network address information in IP packet headers. NAT enables private IP networks that use unregistered IP addresses to connect to the Internet. NAT may operate, for example, on a router connecting two networks together, and translate private (not globally unique) addresses in the internal network into known addresses, before packets are forwarded to another network.

In conventional systems, these domain and address translations may result in the loss of information and failure to track or identify anomalies associated with DNS. The embodiments described herein provide a pervasive view of the network, including both host and network views, which allow for the collection of network data and visibility from a host, processes, and user perspective. This prevents the loss of information even when recursive DNS or NAT is used in the network and allows DNS exchanges to be associated with a host, user, and process, before and after domain or address translation. As shown in FIGS. 1 and 5, the sensors 26 may be located throughout the network and at hosts. One or more of the DNS or NAT devices may also include sensors 26.

Figure 6:
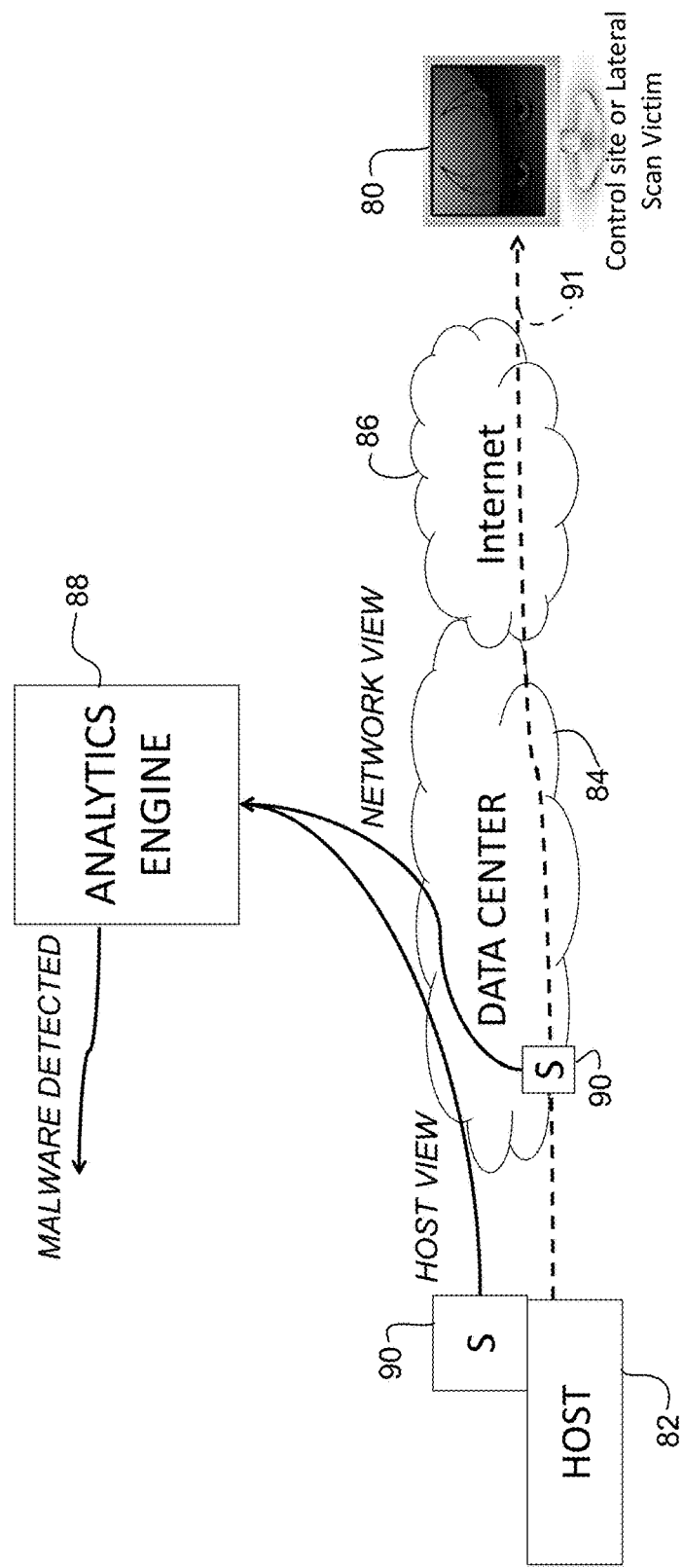
FIG. 6 illustrates malware detection based on sensors installed in the network and components of FIG. 1 to provide a host view and network view.

Malicious entities may use the above described devices or services to initiate an attack. For example, as shown in FIG. 6, a malicious entity 80 (e.g., control site or lateral scan victim) may attempt to insert itself into a network to attack a host 82. The malicious entity 80 may be installed as a direct attack on a system. The malicious entity 80 may contact the host 82 via one or more networks (e.g., data center 84, Internet 86). Traffic from the host 82 may be directed to the malicious entity 80 by a DNS device (e.g., compromised device or device inserted into the network by the malicious entity). As described above with respect to FIG. 1, an analytics engine 88 collects data from sensors 90 located throughout the network 84 and installed in a plurality of components (e.g., host 80, edge device or intermediate nodes in data center 84) to provide a pervasive view of the network and detect network anomalies. The combination of host view and network view allows for detection of network anomalies at the analytics engine 88, regardless of changes in network traffic due to intermediate devices (e.g., name, address, or packet changes that take place at DNS or NAT devices shown in FIG. 5). The plurality of sensors 90 allows for tracking of anomalies to a specific host based on information collected along the data path from the host to the DNS device. DNS exchanges (requests and responses) are monitored from multiple perspectives. This allows the anomaly detection system (analytics engine 88 in FIG. 6) to track command and control (C&C) channels to a translated IP address. Also, anomalies associated with DNS and process/applications are identified based on the information collected by the sensors 90. The pervasive view of the network provided by the anomaly detection system allows for tracking of anomalies associated with DNS interactions when a host query is processed via multiple DNS servers (e.g., recursive, authoritative, root, top level domain), with each DNS server having its own local view. Since the analytics engine 88 has visibility from each host, process, and user perspective, the anomaly detection system is operable to track anomalies associated with each DNS and user account and provides scalability to large network topologies.

In the example shown in FIG. 6, cross correlation may be provided for the host and network views. Differential analysis may be used to identify an attack, including malicious software such as rootkits, which are used to enable access to a computer or area of software that would not otherwise be allowed, while masking its existence. Since the sensors 90 are installed not only in the network 84, but also at the host 82, a differential analysis may be provided using cross correlation between the different views to identify malicious software or exchanges.

Figure 7:
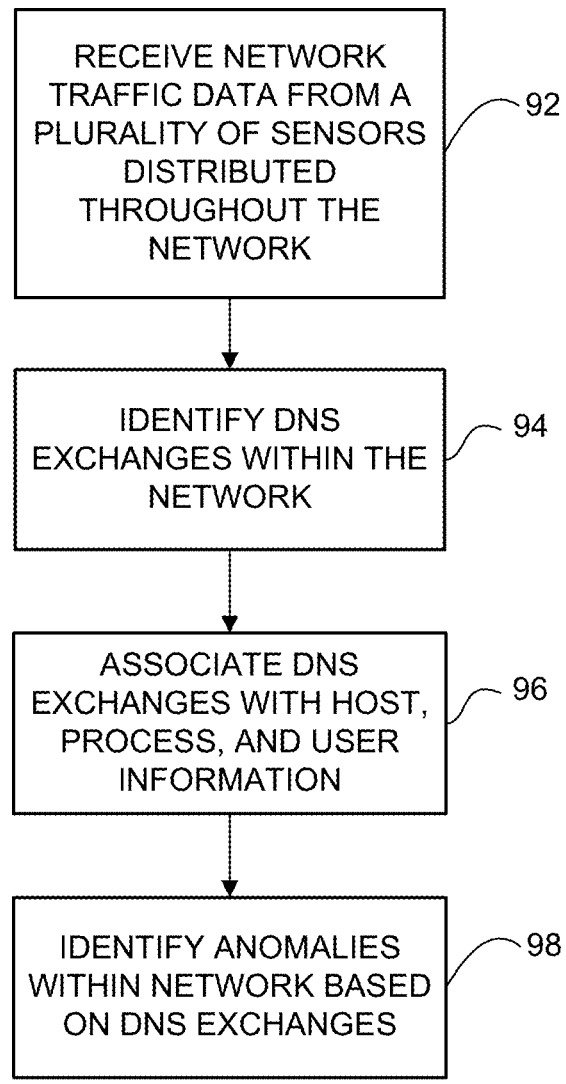
FIG. 7 is a flowchart illustrating an overview of DNS based anomaly detection, in accordance with one embodiment.

FIG. 7 is a flowchart illustrating an overview of a process flow for DNS based anomaly detection, in accordance with one embodiment. As described above with respect to FIG. 1, the data is collected at sensors 26 located throughout the network to monitor packets passing through the network. The analytics module operating at network device 30 receives network traffic data from a plurality of sensors 26 distributed throughout the network (step 92) (FIGS. 1 and 7). The data may comprise, for example, raw flow data. The data collected may be big data (i.e., comprising large data sets having different types of data) and may be multidimensional. The data is captured from multiple perspectives within the network to provide a pervasive network view. The data collected includes process information (e.g., protocol, application, etc.), user information (e.g., user identifier, group identifier, role identifier, etc.), and host information (e.g., IP address, VM or node identifier, etc.). The collected network traffic data is analyzed to identify DNS exchanges (requests, responses) within the network (step 94). The DNS exchanges are associated with host, process, and user information (i.e., host, process, user, or any combination thereof) (step 96). This information is used to identify anomalies within the network based on DNS traffic (exchanges) (step 98).

It is to be understood that the process shown in FIG. 7 and described above is only an example and that steps may be added, combined, removed, or modified without departing from the scope of the embodiments.

Anomaly detection by the DNS module may include, for example, identification of TTL (Time to Live) inconsistencies or network inconsistencies within the DNS exchanges. The TTL inconsistencies may include large variances between TTLs for similar IP addresses.

Anomalies may also be identified based on a second level domain check. The second level domain may be a domain that is directly below a top level domain and may, for example, refer to an organization that registered the domain name with a domain name registrar. A problem or inconsistency may be identified based on a check of the second level domain. For example, there may be an inconsistency between the top level and second level domains.

Another type of DNS based anomaly detection includes DGA (Domain Generation Algorithm) detection. Bots (compromised computers) may use a DGA to produce tens of thousands of random domain names, one of which will actually be registered by the botnet operator. Each bot then sends out DNS queries to the random domains until one of them actually resolves to the address of the command and control server. Botnet operators may control their bots by exploiting DNS domain fluxing. Malware detection may be based on single or double fluxing. The anomaly detection system may, for example, look at DNS interactions and determine whether messages are mapped to different ASNs (Autonomous System Numbers) and IP addresses. The system may also look for a non-readable string or nonexistent domain. As described above, the pervasive network view allows the anomaly detection system to detect malware that may not be detected by security implemented at a single point in the network.

The embodiments may also enable the detection of DNS tunnels used to carry data out of the data center. Referring again to FIG. 6, a tunnel 91 may be created by the malicious entity 80 to carry data out of the data center 84. In one example, TXT (text) records are examined to identify large amounts of data leaving the network. Data collected from sensors 90 installed at endpoints 82 and in the network 84 may be used to identify the DNS tunnel 91.

Malware defense may also include, for example: lateral movement; ADM graph deviation analysis; policy probing; statistical analysis; pivot on destination-distributed scan; pivot on destination and service port; malware/rootkits (e.g., differential analysis); spoofing detection and watch lists (threat feeds); command and control channel; port knocking; network header steganography; DDoS (Distributed Denial of Service); online learnt models with metadata; inside-to-inside DoS (Denial of Service); application performance integration; attacker reputation; dynamic policies; outlier detection; and vulnerability detection.

Various techniques may be used to identify anomalies based on the collected data. In one example, the data source may undergo cleansing and processing in which rule-based algorithms may be applied and known attacks removed from the data for input to anomaly detection. This may be done to reduce contamination from known malicious activity, for example. Features may then be identified (derived, generated) for the data. The collected data may comprise any number of features. Features may be expressed, for example, as vectors, arrays, tables, columns, graphs, or any other representation. The network metadata features may be mixed and involve categorical, binary, and numeric features, for example. The feature distributions may be irregular and exhibit spikiness and pockets of sparsity. The scales may differ, features may not be independent, and may exhibit irregular relationships. The raw features may be used to derive consolidated signals. For example, from flow level data, the average bytes per packet may be calculated for each flow direction. Feature sets may also be derived for different levels of analysis. In one embodiment, a nonparametric, scalable method is defined for identifying network traffic anomalies in multidimensional data with many features.

In certain embodiments discrete numeric features (e.g., byte count and packet count) may be placed into bins of varying size. Univariate transition points may be used so that bin ranges are defined by changes in the observed data. In one example, a statistical test may be used to identify meaningful transition points in the distribution.

In one or more embodiments, anomaly detection may be based on the cumulative probability of time series binned multivariate feature density estimates. In one example, a density may be computed for each binned feature combination to provide time series binned feature density estimates. Anomalies may be identified using nonparametric multivariate density estimation. The estimate of multivariate density may be generated based on historical frequencies of the discretized feature combinations. This provides increased data visibility and understandability, assists in outlier investigation and forensics, and provides building blocks for other potential metrics, views, queries, and experiment inputs.

Rareness may be calculated based on cumulative probability of regions with equal or smaller density. Rareness may be determined, for example, based on an ordering of densities of multivariate cells. In one example, binned feature combinations with the lowest density correspond to the most rare regions. In one or more embodiments, a higher weight may be assigned to more recently observed data and a rareness value computed based on cumulative probability of regions with equal or smaller density. Instead of computing a rareness value for each observation compared to all other observations, a rareness value may also be computed based on particular contexts. New observations with a historically rare combination of features may be labeled as anomalies whereas new observations that correspond to a commonly observed combination of features are not. In one embodiment, a score (e.g., rareness metric) may be calculated to identify malware based on identified anomalies in DNS exchanges.

The anomalies may include, for example, point anomalies, contextual anomalies, and collective anomalies. Point anomalies are observations that are anomalous with respect to the rest of the data. Contextual anomalies are anomalous with respect to a particular context (or subset of the data). A collective anomaly is a set of observations that are anomalous with respect to the data. All of these types of anomalies are applicable to identifying suspicious activity in network data.

The identified anomalies may be used to detect suspicious network activity potentially indicative of malicious behavior. The identified anomalies may be used for downstream purposes including network forensics, policy generation, and enforcement. For example, one or more embodiments may be used to automatically generate optimal signatures, which can then be quickly propagated to help contain the spread of a malware family.

It is to be understood that the processing of network traffic data described above for use in anomaly detection is only an example and other types of processing may be used. More specifically, the grouping of features in varying width bins, multivariate density estimation, and rareness computations described above are only examples and one or more other processes may be used to identify anomalies in the DNS related data collected throughout the network, without departing from the scope of the embodiments.

Figure 8:
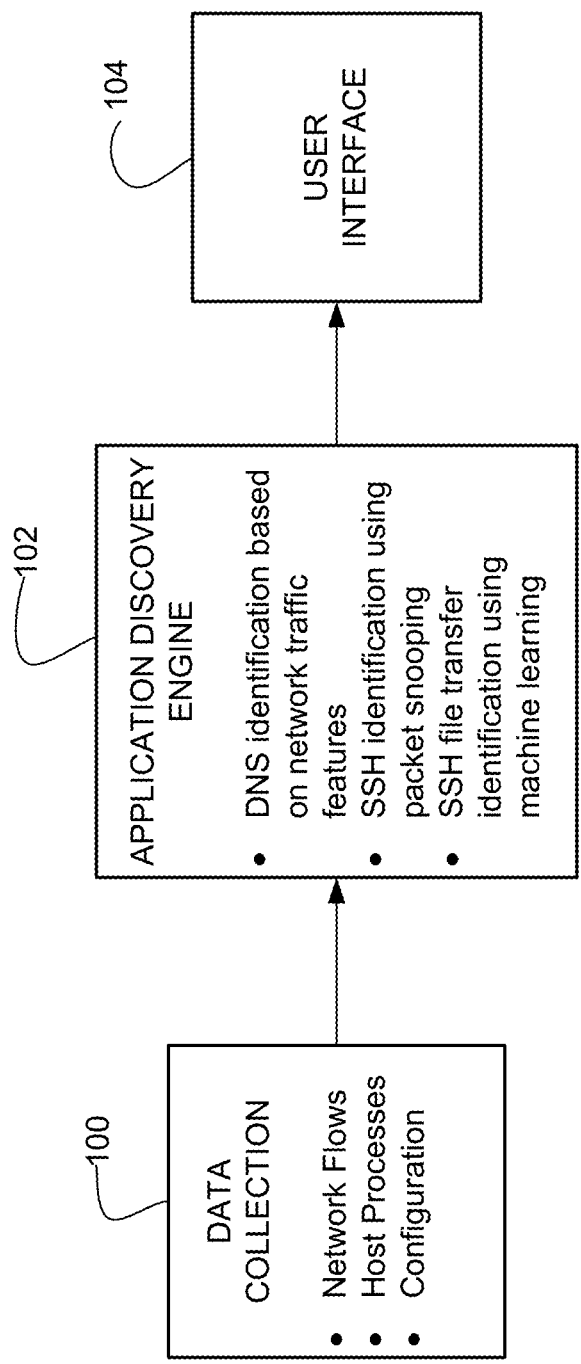
FIG. 8 illustrates an application discovery system, in accordance with one embodiment.

In one embodiment, the data collected may be used for application discovery and identify what is running in a data center. FIG. 8 illustrates an overview of an application discovery system, which includes a data collection component 100, application discovery engine 102, and user interface 104. The data collection may include, for example, network flows, hosts processes (e.g., ps, lsof, or other commands), and configuration (e.g., subnets, DNS, SLB (Server Load Balancing)). As described below, the application discovery engine 102 may provide for the identification of SSH (Secure Shell) and DNS (Domain Name System) traffic and features of associated traffic, without the need for information about the provider port or the particular environment.

Figure 9:
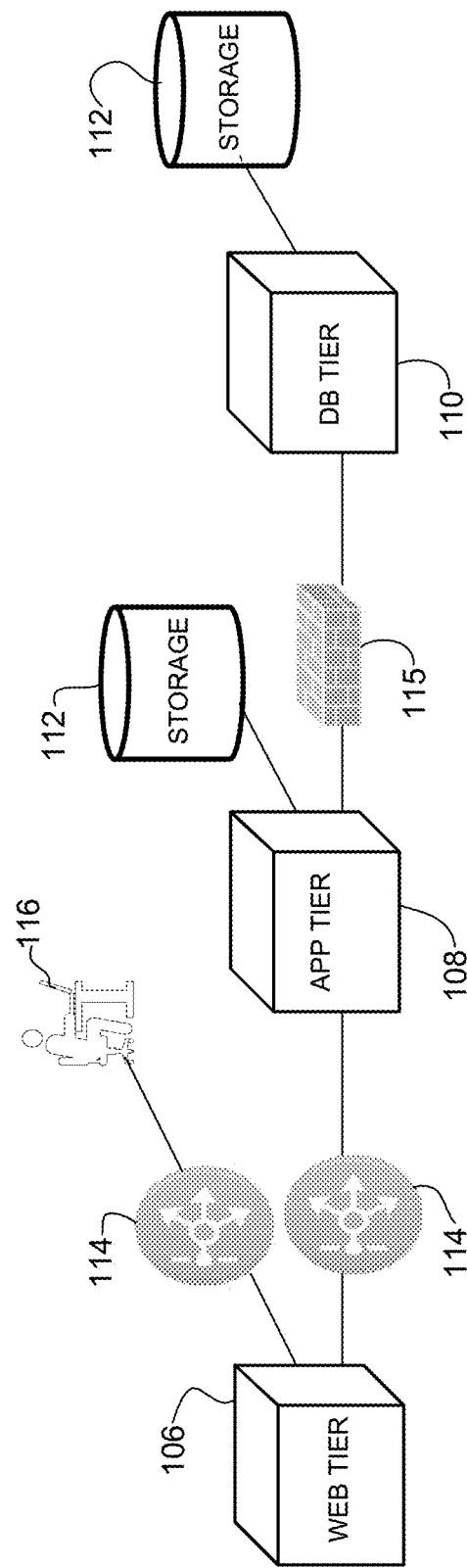
FIG. 9 illustrates an example of application discovery in a network.

As shown in FIG. 9, data may be collected for a web tier 106, application tier 108, and database tier 110. Each tier may comprise associated storage 112. The network may include one or more application control engine modules 114 in communication with a user 116. As shown in FIG. 9, the network may include one or more firewalls 115.

Data may be displayed on a graphical user interface (GUI) 120 such as shown in FIG. 10. The GUI 120 may display, for example, the number and location of applications based on various clusters of the data. It is to be understood that the GUI show in FIG. 10 is only an example and that other graphical displays and interfaces may be used without departing from the scope of the embodiments.

Traditionally, identifying SSH and DNS traffic and features of the associated traffic required information about the provider port and/or the particular environment. However, identifying applications such as SSH and DNS based only on traffic metadata is of great utility. For example, this enables SSH and DNS traffic in unexpected or unknown places to be identified. Similarly, traffic on SSH and DNS ports with flow features that differ from expected SSH and DNS traffic may also be identified.

In one or more embodiments, DNS identification may be performed based on network traffic features. Using machine learning classification, a model for detecting DNS traffic may be built. In one embodiment, for each new environment, model parameters are learned using a subset of traffic in which a DNS label (either DNS traffic or not) is known (or very likely). This may be based on provider port (53) or through other means such as an IP address. The labeled data may then be fed to a machine learning algorithm (e.g., decision trees) to fit model parameters. New flows (without known DNS status) are classified as either DNS or not using the decision tree. As a result, policies can be defined based on DNS classification instead of the port.

In one embodiment, SSH identification may be performed using packet snooping. For example, for all flows the first three packets in the exchange may be reviewed. Packets in which there is an SSL (Secure Sockets Layer) cert exchange are identified as SSH traffic. This allows for the identification of SSH traffic independent of port number. As a result, policies may be defined based on SSH classification instead of the port.

In another embodiment, SSH file transfers may be identified using machine learning. A large dataset for machine learning that includes SSH synthetic data may be generated. This data may be generated in a controlled manner varying the following parameters: size of file transfer; sequence of exchanges (commands and file copies); and type of copy (full directory vs. single file). The training data may then be used to build three classifiers. In the first, a linear regression model is used to predict file transfer size based on flow features. In the remaining two, decision trees may be used to classify SSH flows as manual or automated, and full directory vs. single file.

As can be observed from the foregoing, the embodiments described herein provide numerous advantages. The anomaly detection system provides a big data analytics platform that may be used to monitor everything (e.g., all packets, all network flows) from multiple vantage points to provide a pervasive view of network behavior. The comprehensive and pervasive information about network behavior may be collected over time and stored in a central location to enable the use of machine learning algorithms to detect suspicious activity. One or more embodiments make exhaustive use of DNS to find anomalies in a data center. The embodiments may provide increased data visibility from host, process, and user perspectives and increased understandability. Certain embodiments may be used to assist in outlier investigation and forensics and provide building blocks for other potential metrics, views, queries, or experimental inputs. One or more embodiments may be used to reliably identify application traffic from traffic metadata without inspecting packet payloads.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving at an analytics module operating at a network device, network traffic data collected from a plurality of sensors distributed throughout a network and installed in network components to obtain the network traffic data;
   identifying at the analytics module, Domain Name System (DNS) exchanges within the network;
   associating at the analytics module, said DNS exchanges with processes running on the network components, user information for network flows, and host information; and
   identifying at the analytics module, anomalies in said DNS exchanges;
   wherein the network components comprise a plurality of leaf nodes and endpoints operating in the network, the sensors installed in the network components to provide a pervasive view of network behavior and monitor said DNS exchanges from multiple perspectives within the network including host, user, and process perspectives.

2. The method of claim 1 wherein the network traffic data is collected from packets transmitted to and from the network components to monitor network flows at hosts and within the network from multiple perspectives in the network.

3. The method of claim 1 wherein identifying said anomalies comprises calculating scores for said DNS exchanges to identify said anomalies.

4. The method of claim 1 wherein identifying said anomalies comprises identifying TTL (Time to Live) inconsistencies within said DNS exchanges.

5. The method of claim 1 wherein identifying said anomalies comprises identifying network inconsistencies within said DNS exchanges.

6. The method of claim 1 further comprising performing a second level domain check and wherein said anomalies are identified based on said second level domain check.

7. The method of claim 1 wherein identifying said anomalies comprises detecting a Domain Generation Algorithm (DGA).

8. The method of claim 1 wherein identifying said anomalies comprises detecting domain fluxing.

9. The method of claim 1 wherein identifying said anomalies comprises identifying use of DNS tunnels to carry data.

10. The method of claim 1 wherein identifying said anomalies comprises utilizing cross correlation between host and network views of the network traffic data.

11. The method of claim 1 wherein identifying said DNS exchanges further comprises discovering applications in the network.

12. The method of claim 1 further comprising generating application specific features for SSH (Secure Shell) traffic using machine learning.

13. The method of claim 1 further comprising identifying SSH (Secure Shell) traffic using packet snooping.

14. The method of claim 1 wherein the network traffic data is received from at least one network device comprising multiple sensors.

15. An apparatus comprising:
    an interface for receiving network traffic data collected from a plurality of sensors distributed throughout a network and installed in network components to obtain the network traffic data; and
    a processor for identifying Domain Name System (DNS) exchanges within the network, associating said DNS exchanges with processes running on the network components, user information for network flows, and host information, and identifying anomalies in said DNS exchanges;
    wherein the network components comprise a plurality of leaf nodes and endpoints operating in the network, the sensors installed in the network components to provide a pervasive view of network behavior and monitor said DNS exchanges from multiple perspectives within the network including host, user, and process perspectives.

16. The apparatus of claim 15 wherein the network traffic data comprises data collected from a network device comprising multiple sensors.

17. The apparatus of claim 15 wherein identifying said anomalies comprises identifying use of DNS tunnels to carry data.

18. Logic encoded on one or more non-transitory computer readable media for execution and when executed operable to:
    process at an analytics module operating at a network device, network traffic data collected from a plurality of sensors distributed throughout a network and installed in network components to obtain the network traffic data;
    identify at the analytics module, Domain Name System (DNS) exchanges within the network;
    associate at the analytics module, said DNS exchanges with processes running on the network components, user information for network flows, and host information; and
    identify at the analytics module, anomalies in said DNS exchanges;
    wherein the network components comprise a plurality of leaf nodes and endpoints operating in the network, the sensors installed in the network components to provide a pervasive view of network behavior and monitor said DNS exchanges from multiple perspectives within the network including host, user, and process perspectives.

19. The logic of claim 18 wherein identifying said anomalies comprises identifying use of DNS tunnels to carry data.

20. The logic of claim 18 further operable to generate application specific features for DNS traffic using machine learning.

* * * * *